(12) United States Patent
Smith et al.

(10) Patent No.: US 9,341,158 B2
(45) Date of Patent: May 17, 2016

(54) QUIET WIND TURBINE BLADE

(71) Applicant: Inventus Holdings, LLC, Juno Beach, FL (US)

(72) Inventors: Gregory J. Smith, Port St. Lucie, FL (US); Daniel Brake, Hobe Sound, FL (US)

(73) Assignee: Inventus Holdings, LLC, Juno Beach, FL (US)

( * ) Notice: Subject to any disclaimer, the term of this patent is extended or adjusted under 35 U.S.C. 154(b) by 621 days.

(21) Appl. No.: 13/709,694

(22) Filed: Dec. 10, 2012

(65) Prior Publication Data
US 2013/0149162 A1    Jun. 13, 2013

Related U.S. Application Data

(60) Provisional application No. 61/568,302, filed on Dec. 8, 2011.

(51) Int. Cl.
*F03D 1/06*    (2006.01)

(52) U.S. Cl.
CPC ......... *F03D 1/0633* (2013.01); *F05B 2240/122* (2013.01); *Y02E 10/721* (2013.01)

(58) Field of Classification Search
CPC   B64C 21/00; B64C 2230/14; B64C 2230/26; F03D 1/0633; F03D 1/0641; F03D 7/0296; F05B 2240/122; F05B 2240/221; F05B 2240/30; F05B 2240/301; F05B 2240/32; F05B 2260/96; F05B 2260/926; Y02E 10/721; Y02T 50/166
USPC ................................. 416/228, 223 R–223 B
See application file for complete search history.

(56) References Cited

U.S. PATENT DOCUMENTS

| | | | | |
|---|---|---|---|---|
| 573,562 | A * | 12/1896 | Wittram | 416/235 |
| 1,466,551 | A * | 8/1923 | Thurston | B64C 23/065 244/218 |
| 3,365,126 | A * | 1/1968 | Stoffer | F01D 5/141 416/228 |
| 4,830,315 | A * | 5/1989 | Presz, Jr. | B64C 21/10 114/102.29 |
| 4,930,729 | A * | 6/1990 | Savill | B63B 1/34 138/37 |
| 5,074,376 | A | 12/1991 | Powell | |
| 5,088,665 | A | 2/1992 | Vijgen et al. | |
| 5,107,626 | A * | 4/1992 | Mucci | B24B 19/028 451/28 |
| 5,386,955 | A * | 2/1995 | Savill | B63B 1/34 138/38 |
| 5,533,865 | A | 7/1996 | Dassen et al. | |
| 5,542,630 | A * | 8/1996 | Savill | B63B 1/34 244/200 |
| 6,004,102 | A | 12/1999 | Kuefner et al. | |
| 6,733,240 | B2 * | 5/2004 | Gliebe | F01D 5/141 416/228 |
| 6,779,978 | B2 * | 8/2004 | Camargo Do Amarante | F04D 29/384 416/228 |
| 6,830,436 | B2 | 12/2004 | Shibata et al. | |
| 7,059,833 | B2 | 6/2006 | Stiesdal et al. | |
| 7,413,408 | B1 | 8/2008 | Tafoya | |
| 7,909,576 | B1 | 3/2011 | Van der Bos et al. | |
| 7,918,653 | B2 | 4/2011 | Standish et al. | |
| 7,976,276 | B2 * | 7/2011 | Riddell | F03D 1/0633 416/223 R |
| 7,976,283 | B2 * | 7/2011 | Huck | F03D 1/0633 415/119 |
| 8,083,488 | B2 * | 12/2011 | Fritz | F03D 1/0675 416/224 |

(Continued)

*Primary Examiner* — Troy Chambers
*Assistant Examiner* — Joshua Semick
(74) *Attorney, Agent, or Firm* — Feldman Gale, P.A.

(57) ABSTRACT

Noise produced by the blades of a wind turbine electric generator is reduced by creating randomly varied serrations on the trailing edge of the blade, thereby creating vortices of varying size, energy, and distance from the trailing edge. This configuration creates vortices that tend to cancel one another while avoiding the creation of adjacent, mutually reinforcing vortices.

5 Claims, 3 Drawing Sheets

(56) References Cited

U.S. PATENT DOCUMENTS

| | | | |
|---|---|---|---|
| 8,414,261 B2* | 4/2013 | Bonnet | F03D 1/0641 415/119 |
| 8,523,515 B2* | 9/2013 | Drobietz | F03D 1/0675 415/119 |
| 8,794,927 B2* | 8/2014 | Vassilicos | F15D 1/10 416/228 |
| 2003/0099546 A1 | 5/2003 | Stiesdal et al. | |
| 2007/0077150 A1* | 4/2007 | Llorente Gonzalez | F03D 1/0608 416/223 R |
| 2008/0187442 A1* | 8/2008 | Standish | F03D 1/001 416/235 |
| 2009/0074585 A1 | 3/2009 | Koegler et al. | |
| 2009/0097976 A1 | 4/2009 | Driver et al. | |
| 2010/0209257 A1* | 8/2010 | Fuglsang | F01D 5/145 416/90 R |
| 2010/0260614 A1* | 10/2010 | Fuglsang | F01D 5/145 416/241 R |
| 2011/0018282 A1 | 1/2011 | Hayashi et al. | |
| 2011/0223030 A1* | 9/2011 | Huck | F03D 11/00 416/228 |
| 2011/0229321 A1* | 9/2011 | Kilaras | F03B 3/121 416/1 |
| 2014/0227101 A1* | 8/2014 | Yao | F03D 1/0608 416/236 R |

* cited by examiner

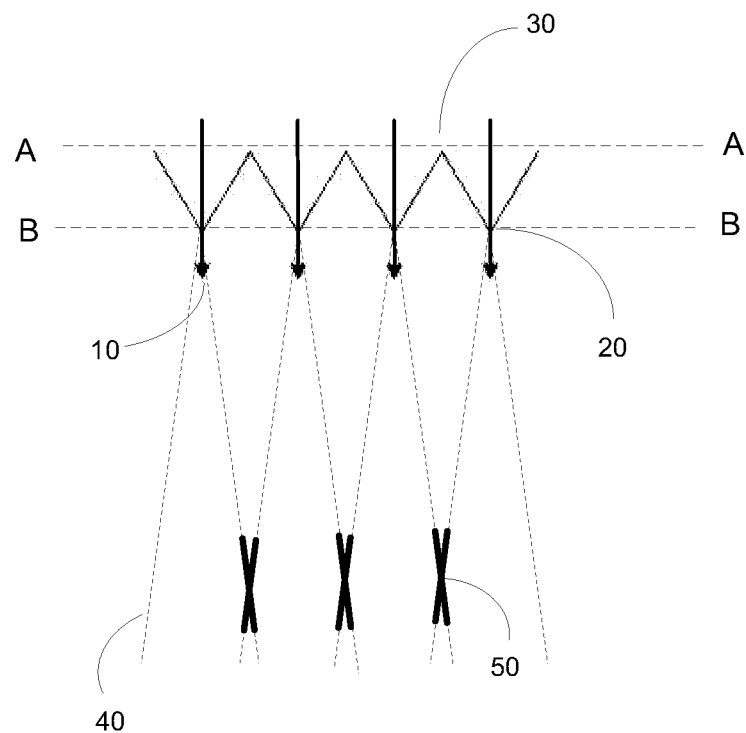
Fig. 1 – Prior Art
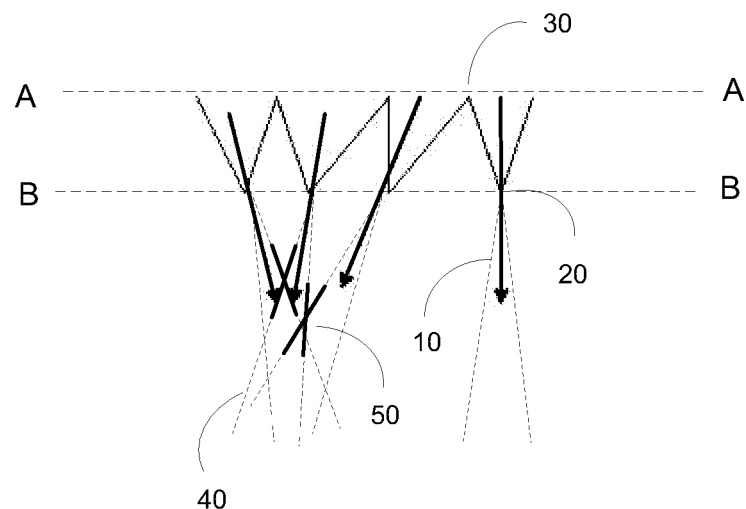
Fig. 2 – Prior Art

QUIET WIND TURBINE BLADE

CROSS-REFERENCE TO RELATED APPLICATIONS

This application claims the benefit of U.S. Provisional Application No. 61/568,302 filed Dec. 8, 2011, the disclosure of which is hereby incorporated herein by reference in its entirety.

BACKGROUND

Wind turbine technology is providing an ever-increasing proportion of the electrical energy generated in the United States and worldwide. Typically, at least in the United States, wind farms have been located in rural or sparsely populated areas. However, with an increasing demand for the renewable energy represented by wind turbine generators, it is likely that wind farms will in the future be situated closer to populated areas than they are today. When that happens, nuisances created by wind farms will become problematical as people discover that there are esthetic impediments and practical drawbacks to living or working in close proximity to a wind farm. Chief amongst these is the fact that wind turbines are noisy.

Studies conducted to determine both the level of noise generated by wind turbines, and the frequencies and pervasiveness of such noise, provide startling conclusions that wind turbine noise is a significantly greater annoyance to humans than previously suspected. Utility wind turbine generators, for example, can develop noise in the range of 90-100 db at or near the base of the tower. While some of the noise of a wind turbine generator is based upon mechanical factors such as gear boxes, generators, and turning parts, a significant portion of the noise is due to aerodynamic factors related to the shape of the blades that catch the wind.

Wind turbine blades are airfoils that provide lift by means of the differential in pressure as air flows over the blades. The differential pressure and subsequent lift is caused because air passing over the top of the blade travels faster than air traveling over the bottom of the blade. As the air converges at the trailing edge of the blade the differing air velocities cause vortices. Vortices are whirling air disturbances that maintain their general shape until the energy within them dissipates, at which point they collapse, resulting in an implosion of air that raises sound pressure levels, or noise. Regular vortices that form at the trailing edge of an aerodynamic surface such as, for example, a helicopter main rotor blade, create distinctive sounds as they collapse. The same phenomenon causes wind turbine generators to make noise as the blades rotate in response to wind. Where the trailing edge of an airfoil is substantially straight, vortices of approximately equal strength will develop as air passes over the airfoil, and will tend to collapse substantially simultaneously at a given distance behind the trailing edge. The sound made by the collapse of individual vortices is reinforced through the simultaneous collapse of adjacent vortices created by the same trailing edge, with the result that appreciable and potentially annoying noise is generated behind each blade of a rotating wind turbine.

A number of techniques have been employed to reduce or change the pattern of vortices caused by air confluence at trailing edge of the blade, and thereby reduce noise emissions. One such method is to add serrations to the trailing edge of the blade in order to reduce the vortices thereby reducing the sound pressure level. The serrations are generally equally spaced serrations of the same size positioned along the trailing edge of the blade. See, e.g., U.S. Pub. No. 2009/0074585 to Koegler et al.; U.S. Pat. No. 7,059,833 to Stiesdal et al.

The major problem with the current technology however is that although serrations may be effective in reducing overall noise levels, the resulting frequency and amplitude of vibration remain as a constant repeating pattern. What is needed is a means to reduce aerodynamic noise generated by commercial wind turbine blades without significantly reducing blade efficiency or adding to the weight or cost of the unit.

SUMMARY OF THE INVENTION

The invention is to create randomly varied serrations on the trailing edge of the blade of a wind turbine. By so doing, vortices of varying size and energy are created as the blade turns and, because the vortices are random and irregular, they will tend to cancel or negate one another, rather than reinforce the adjacent vortices with which they interact. The result is to create vortices of randomly variable energies, frequencies and amplitudes that will not implode in regular patterns that cause noise.

Variations in the serration pattern along the trailing edge of a blade may take such forms as points of differing lengths (measured along a perpendicular line from the trailing edge of the blade to the tip of the serration), differing angles at the points of adjacent serrations, and differing angles between the trailing edge of the blade and lines bisecting the angles formed at the point of each serration. These varying serration parameters mimic some of the random feather patterns noted in the wings of birds of prey, whose ability to capture prey depends upon essentially noiseless flight, and who may be distinguished from other bird species whose wings do not exhibit that characteristic.

BRIEF DESCRIPTION OF THE DRAWINGS

FIG. 1 depicts a conventional serrated trailing edge of the kind used in the prior art.

FIG. 2 depicts a second variation of serrated trailing edge that is used in the prior art.

DETAILED DESCRIPTION OF THE PREFERRED EMBODIMENTS

Figure 3:
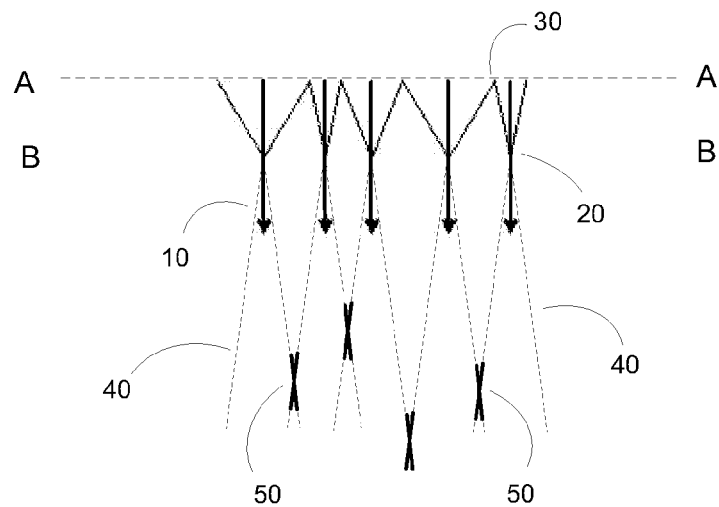
FIG. 3 shows an embodiment of the serrated trailing edge of this invention.

Prior art attempts to alleviate the problem of noise associated with the rotation of turbine blades have met with mixed results. FIG. 1, depicts a prior art configuration that allows the formation of regular vortices at the trailing edge of an airfoil, such as an aircraft wing or a helicopter or turbine blade. The regular and repeated pattern of FIG. 1 permits air currents to flow directly to the rear of the airfoil, as indicated by arrows 10. The trailing edge has serrations characterized by peaks or points 20 and troughs or valleys 30. In the regular patters shown in FIG. 1, all of the troughs terminate along a line A-A incident or parallel to the trailing edge of the airfoil. All of the peaks terminate along a line B-B that is substantially parallel to line A-A and the trailing edge of the airfoil. Vortices 40 (indicated by dotted lines) develop at the points where the airflow 10 leaves the trailing edge of the airfoil. Such vortices comprise high energy twisting airstreams having a characteristic circular cyclonic or anti-cyclonic motion and capturing an area of relatively lower pressure within the center region. As the vortices travel downstream relative to the trailing edge of the airfoil, their rotational energy causes the circular currents to expand, increasing their radii and dissipating energy. At a point downstream of the trailing edge, adjacent vortices may interact, the point of interaction being designated by heavy, non-broken lines at reference numeral 50. Where the vortices interact, chaotic motion may occur, and the energy that powered the circular rotational motion is suddenly dissipated. At that point, the vortices may collapse in to the lower pressure region, causing audible noise that, repeated along the length of the airfoil, provides the characteristic sound associated with the particular airfoil. In the case of wind turbine blades, the characteristic whoosh-whoosh-whoosh sound produced as each blade passes a particular point is easily recognizable. An extreme example of such noise is that which is heard when a helicopter is lifting off or operating under a heavy load.

In the configuration shown in FIG. 1, vortices formed at the points 20 of the serrated trailing edge form regular patterns such that noise generated when the vortices collapse is repeated and reinforced along the length of the airfoil. When this trailing edge is applied to a wind turbine blade, the regular repeating pattern depicted in FIG. 1 fails to suppress the noise generated by the blade and may, in some instances, actually amplify it.

One prior art attempt at alleviating the problems indicated by FIG. 1 is depicted in FIG. 2. In FIG. 2, serrations indicated by points 20 and troughs 30 have been skewed to form triangular points that do not form repeating angles with respect to the trailing edge, indicated by line A-A. However, the critical points that affect the formation of vortices—the points and troughs of the serrations—remain essentially parallel, meaning that vortex formation will occur at essentially the same distance downstream of the trailing edge of the airfoil for all vortices. In the absence of vortex-to-vortex interference, it may be expected that the vortices will each have approximately the same energy, and may dissipate that energy at the same rate, with the result that vortex collapse would occur substantially simultaneously for all vortices, and the noise of each vortex collapse would be reinforced and amplified by others occurring at the same time.

In this configuration, however, air currents leaving the trailing edge of a wing or blade may not be parallel because of the irregular angles at which adjacent serrations meet. The resulting vortex formation may exhibit characteristics of being skewed in a cross-wind direction, and may generate areas of higher and lower pressure immediately behind the blade. At subsonic speeds, this phenomenon may affect upstream airflow across the blade, and could result in reduced aerodynamic performance of the blade. Thus, while regular vortex formation can be avoided, the chaotic and unpredictable nature of vortices created by this configuration may result in reduced efficiency and a loss of power across the operating spectrum.

FIG. 3 depicts one embodiment of the present invention. In FIG. 3, adjacent vortices 40 are spaced apart at irregular intervals, and the angles forming adjacent troughs 30 and points 40 are similarly irregular and non-repeating. In this case, the points of intersection 50 of adjacent vortices is varied with respect to the distance from the trailing edge of the blade. If the vortices have sufficient energy to avoid collapse until they begin to interact with adjacent vortices, the point at which the vortices interact and collapse will occur at different distances behind the trailing edge of the blade. When this happens, the noise associated with the collapse will occur at slightly different times, and the reinforcing effect of simultaneous collapses may be avoided, resulting in a lower noise level.

Figure 4:
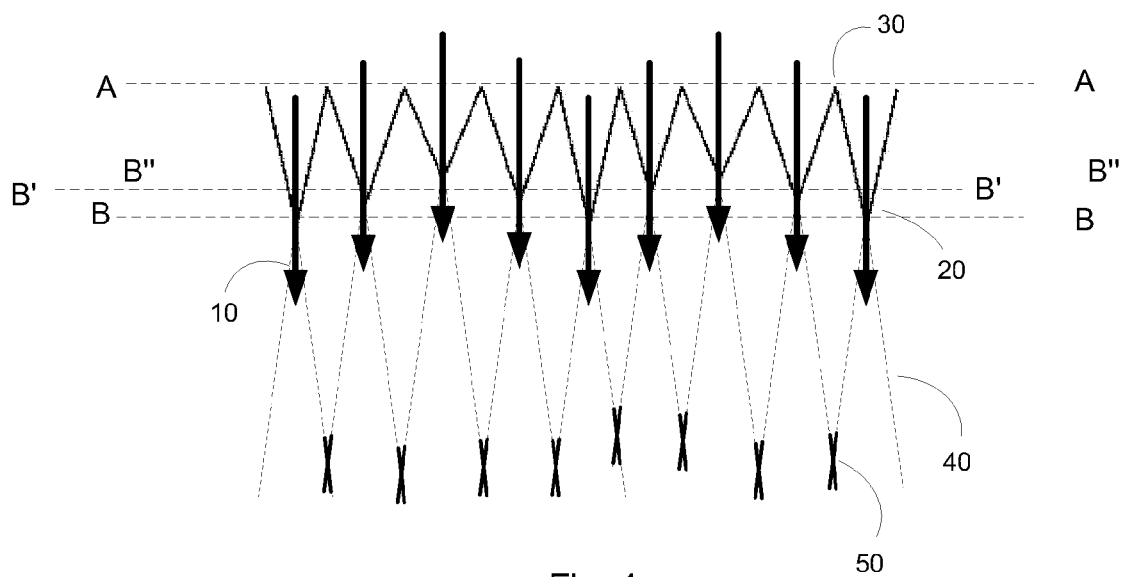
FIG. 4 illustrates a second embodiment of the serrated trailing edge of this invention.

A similar result may be achieved with the configuration depicted in FIG. 4. In FIG. 4, the points 20 of adjacent serrations have been varied with respect to the trailing edge A-A, as can be seen in adjacent points ending at lines B-B, B'-B', and B"-B". The advantageous effect of varying the point-to-trailing edge distance for adjacent points 20 may be further enhanced where the spanwise distance between adjacent points 20 is also varied such that the points of intersection 50 of a series of adjacent vortices 40 occur upstream or downstream with respect to one another and with respect to the trailing edge A-A.

Figure 5:
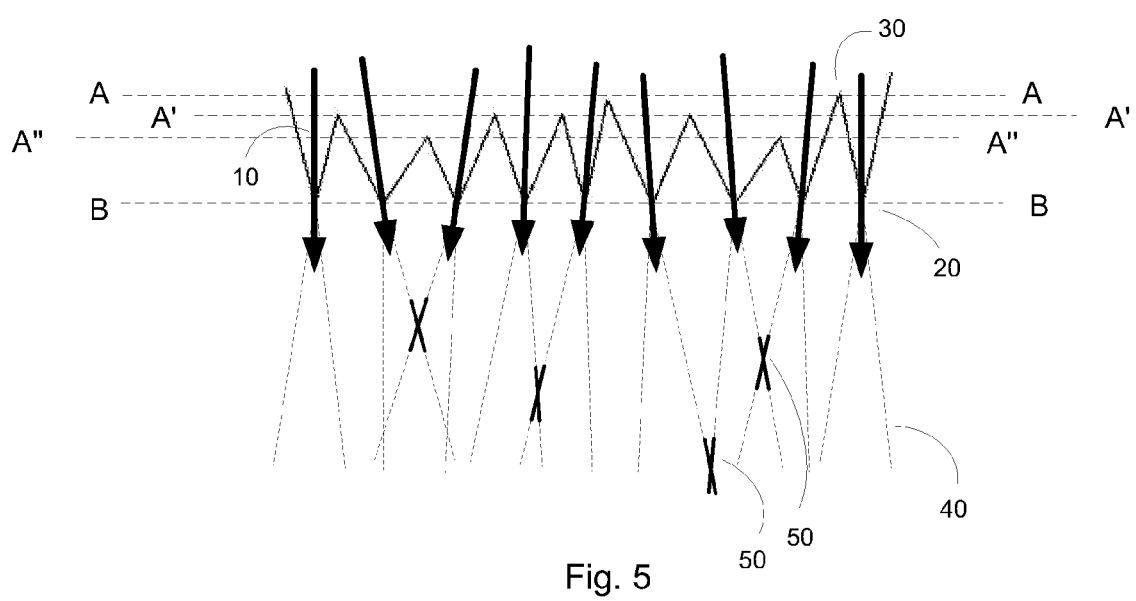
FIG. 5 shows a third embodiment of the serrated trailing edge of this invention.

FIG. 5 illustrates yet another embodiment for a serrated trailing edge of a turbine blade. In FIG. 5, the troughs terminate at varying distances from the trailing edge, as can be noted by lines A-A, A'-A', and A"-A", each of which demarks the termination point of a trough. The effect is similar to that achieved by the configuration of FIG. 4.

The configurations depicted in FIGS. 4 and 5 allow the manipulation of vortex formation to be controlled and predicted. Varying angles between troughs 30 and points 40 may be expected to produce vortices of differing initial sizes and energies, further depending upon wind velocity across the blade and pressure differences between the high and low-pressure sides of the blade. In other embodiments, both the trough-to-trailing edge and the point-to-trailing edge distances may be varied, as well as the point-to-point spanwise distance, to control the points at which vortices may form, and the initial sizes and energy for them. In yet other embodiments, the points may also be varied in a zig-zag pattern to terminate above or below the plane formed by the trailing edge.

Serrated strips may be retrofitted to existing wind turbine installations by forming the serrations on suitable metallic, fiberglass, plastic, or other suitable material and affixing the strips to the trailing edges of turbine blades. Preferably, serrated strips should be applied to the outer portions of a blade, and should be mounted essentially along and parallel to the plane of the low pressure side of the blade near the trailing edge.

We claim:

1. A blade of a wind turbine comprising:
   an airfoil, said airfoil having a substantially straight trailing edge and a plurality of essentially planar serrations located at said trailing edge;
   each of said plurality of serrations comprising two or more substantially straight edges such that edges of adjacent serrations meet to form a trough proximal to said trailing edge, a location of said trough defining a trough length as being the shortest distance between said trough and the nearest point of said trailing edge;
   each of said plurality of serrations terminating at a serration point distal to said trailing edge, each said serration point being at the farthest downwind extremity of each said serration, a location of each said serration point defining a respective serration length as being the shortest distance from said serration point to the nearest point of said trailing edge; and wherein no three adjacent serration points are equally spaced apart from each other.

2. A blade of a wind turbine comprising:
   an airfoil, said airfoil having a substantially straight trailing edge and a plurality of essentially planar serrations located at said trailing edge;

each of said plurality of serrations comprising two or more substantially straight edges such that edges of adjacent serrations meet to form a trough proximal to said trailing edge, a location of said trough defining a trough length as being the shortest distance between said trough and the nearest point of said trailing edge;

each of said plurality of serrations terminating at a serration point distal to said trailing edge, each said serration point being at the farthest downwind extremity of each said serration, a location of each said serration point defining a respective serration length as being the shortest distance from said serration point to the nearest point of said trailing edge; said trough lengths being substantially equal; and wherein no three adjacent serration lengths are equal; and wherein no three adjacent serration points are equally spaced apart from each other.

3. A blade of a wind turbine comprising:

an airfoil, said airfoil having a substantially straight trailing edge and a plurality of essentially planar serrations located at said trailing edge;

each of said plurality of serrations comprising two or more substantially straight edges such that edges of adjacent serrations meet to form a trough proximal to said trailing edge, a location of said trough defining a trough length as being the shortest distance between said trough and the nearest point of said trailing edge;

each of said plurality of serrations terminating at a serration point distal to said trailing edge, each said serration point being at the farthest downwind extremity of each said serration, a location of each said serration point defining a serration length as being the shortest distance from said point to the nearest point of said trailing edge;

said serration lengths being substantially equal; and wherein no three adjacent trough lengths are equal.

4. The blade of claim 1 wherein adjacent troughs are equidistant from an intervening serration point.

5. The blade of claim 3 wherein no three adjacent serration points are equally spaced apart from each other.

\* \* \* \* \*